United States Patent
Yamaguchi

(10) Patent No.: US 8,189,230 B2
(45) Date of Patent: May 29, 2012

(54) SHIFTING PRINT AREAS FOR COVER AND BODY IN BOOK BINDING

(75) Inventor: Hiroshi Yamaguchi, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1042 days.

(21) Appl. No.: 11/516,124

(22) Filed: Sep. 6, 2006

(65) Prior Publication Data

US 2007/0177210 A1 Aug. 2, 2007

(30) Foreign Application Priority Data

Jan. 27, 2006 (JP) ................................ 2006-019469

(51) Int. Cl.
*G06F 15/00* (2006.01)
*G03G 14/04* (2006.01)
*B42C 9/00* (2006.01)
*B42C 11/00* (2006.01)

(52) U.S. Cl. ............... 358/1.18; 399/193; 412/1; 412/4

(58) Field of Classification Search ............... 358/1.18; 399/193; 412/1, 4

See application file for complete search history.

(56) References Cited

U.S. PATENT DOCUMENTS

| | | | | |
|---|---|---|---|---|
| 5,774,232 A | * | 6/1998 | Tabata et al. ................... | 358/448 |
| 7,454,163 B2 | | 11/2008 | Kasahara et al. | |
| 7,603,074 B2 | * | 10/2009 | Yamaguchi .................... | 399/408 |
| 2002/0054372 A1 | * | 5/2002 | Takahashi ..................... | 358/451 |
| 2002/0057453 A1 | * | 5/2002 | Michaelis et al. ........... | 358/1.15 |

FOREIGN PATENT DOCUMENTS

| | | |
|---|---|---|
| JP | 2004-155152 A | 6/2004 |
| JP | 2004-209869 A | 7/2004 |
| JP | 2005-329588 A | 2/2005 |
| JP | 2005-115958 A | 4/2005 |
| JP | 2005-216242 A | 8/2005 |
| JP | 2005-338416 A | 12/2005 |

OTHER PUBLICATIONS

Japanese Office Action dated Apr. 21, 2009 (2 pages), and English translation thereof (2 pages), issued in counterpart Japanese Application Serial No. 2006-019469.
Japanese Office Action (Trial) dated Oct. 12, 2010 (and English translation thereof) in counterpart Japanese Application No. 2009-20067.

* cited by examiner

*Primary Examiner* — Benny Q Tieu
*Assistant Examiner* — Eric A Rust
(74) *Attorney, Agent, or Firm* — Holtz, Holtz, Goodman & Chick, PC

(57) ABSTRACT

An image forming apparatus including: a data input section to input document image data including cover sheet image data and body text image data; an image forming section to form an image on a recording medium based on the document image data; an input section to input a shift instruction for shifting a print area of the document image data; and a control section to control the image forming section so that images are formed by shifting only a body text image corresponding to the body text image data of the document image data on the recording medium while not shifting a cover sheet image corresponding to the cover sheet image data of the document image data, based on the shift instruction inputted from the input section.

6 Claims, 12 Drawing Sheets

SHIFTING PRINT AREAS FOR COVER AND BODY IN BOOK BINDING

This application is based on Japanese Patent Application No. 2006-19469 filed in Japan on Jan. 27, 2006, the entire content of which is hereby incorporated by reference.

BACKGROUND OF THE INVENTION

1. Field of the Invention

The present invention relates to an image forming apparatus, an image forming system, an image forming control apparatus and a control program. Particularly the present invention relates to an image forming apparatus, an image forming system, an image forming control apparatus and a control program, which are capable of shifting a body text portion of a document to form the image.

2. Description of the Related Art

In recent years, an image forming apparatus, into which a bookbinding system is installed, is disclosed, for example, in Japanese Patent Application Open to Public Inspection No. 2004-209869. The image forming apparatus is capable of binding a book through an online network. In such an image forming apparatus, a cover sheet and a body text portion of a book can be collectively formed into an image. In the image forming apparatus, the image formation is conducted so that the document image having a predetermined size and register marks T indicating the cutting position located at the outside of the four corners of the document and the outside of the predetermined size are formed into an image on a wide paper sheet which is a little bit larger than the predetermined size. Thus it is possible to correctly cut the cover sheet and the text portion of the book after the bookbinding based on the register mark. For example, FIG. 11 illustrates the relationship between the document image position and the register marks after the image formation of the cover sheet and the body text portion of the book. As shown in FIG. 11, in the case that a cover sheet document image 101 and a body text portion document image 102 are respectively disposed on the center of a paper sheet L1 and a paper sheet L2, it is necessary to cut four sides of respective paper sheets L1 and L2. In the case of a bookbinding system utilizing online network, there is a case that the cutting portion of the body text page L2, which is going to be fixed onto a spine cover, is not cut. In order to respond to this type of bookbinding system, as illustrated in FIG. 12, an image forming apparatus for forming the image while shifting the document images 101 and 102 to the edge portion, which is going to be fixed onto the spine has been developed.

However, in the case that the image forming apparatus is one, which is capable of shifting the document images 101 and 102 to one edge, the cover sheet document image 101 also shifts the same distance as the shift amount of body text of the document image 102. As a result, the cover sheet document image 101 is shifted to one end. Thus, the center of the document image 101 of the cover sheet shifts and there is a possibility that the body text page L2 is not fixed at the correct position of the cover sheet.

SUMMARY OF THE INVENTION

In accordance with one of the aspect of the present invention an image forming apparatus comprises a data input section to input document image data including cover sheet image data and body text image data; an image forming section to form an image on a recording medium based on the document image data; an input section to input a shift instruction for shifting a print area of the document image data; and a control section to control the image forming section so that images are formed by shifting only a body text image corresponding to the body text image data of the document image data on the recording medium while not shifting a cover sheet image corresponding to the cover sheet image data of the document image data, based on the shift instruction inputted from the input section.

In accordance with another aspect of the present invention, an image forming system comprises an image forming apparatus and an image forming control apparatus, wherein the image forming control apparatus comprises: a data generation section to generate document image data including cover sheet image data and body text image data; and a transmission section to transmit a shift instruction for shifting a print area of the document image data, and the document image data to the image forming apparatus, wherein the image forming apparatus comprises: an image forming section to form an image on a recording medium; an input section to input the document image data and the shift instruction; and a control section to control the image forming section so that an image is formed by shifting only a body text image corresponding to the body text image data of the document image data on the recording medium while not shifting a cover sheet image corresponding to the cover sheet image data of the document image data based on the shift instruction inputted from the input section.

In accordance with another aspect of the present invention, an image forming system comprises an image forming apparatus and an image forming control apparatus, wherein the image forming control apparatus comprises: a data generation section to generate document image data including cover sheet image data and body text image data; and a transmission section to transmit a shift instruction for shifting a print area of the document image data, and the document image data to the image forming apparatus, wherein the image forming apparatus comprises: an image forming section to form an image on a recording medium; an input section to input the document image data and the shift instruction; and a control section to control the image forming section so that an image is formed by independently setting a shift process of a body text image corresponding to the body text image data and a shift process of a cover sheet image corresponding to the cover sheet image data and shifting the body text image on the recording medium.

According to another aspect of the present invention, a control program for controlling an image forming apparatus, the control program comprising the steps of: inputting a shift instruction to shift a print area of document image data including cover sheet image data and body text image data; and forming images so that shifted is only a body text image corresponding to the body text image data of the document image data on the recording medium while not shifted is a cover sheet image corresponding to the cover sheet image data of the document image data, based on the shift instruction.

According to anther aspect of the present invention, a control program for controlling an image forming control apparatus for transmitting document image data to an image forming apparatus, the control program comprising the steps of: generating document image data including cover sheet image data and body text image data; inputting a shift instruction for shifting a print area of the document image data; applying image processing to the document image data so that shifted is only a body text image corresponding to the body text image data on a recording medium based on the shift instruction while not shifted is a cover sheet image corresponding to the cover sheet image data; and transmitting the document image data, to which the processing is applied, onto the image forming apparatus.

BRIEF DESCRIPTION OF THE DRAWINGS

These and other objects, advantages and features of the invention will become apparent from the following description thereof taken in conjunction with the accompanying drawings in which.

In the following description, like parts are designated by like reference numbers throughout the several drawings.

DESCRIPTION OF THE PREFERRED EMBODIMENT

Figure 1:
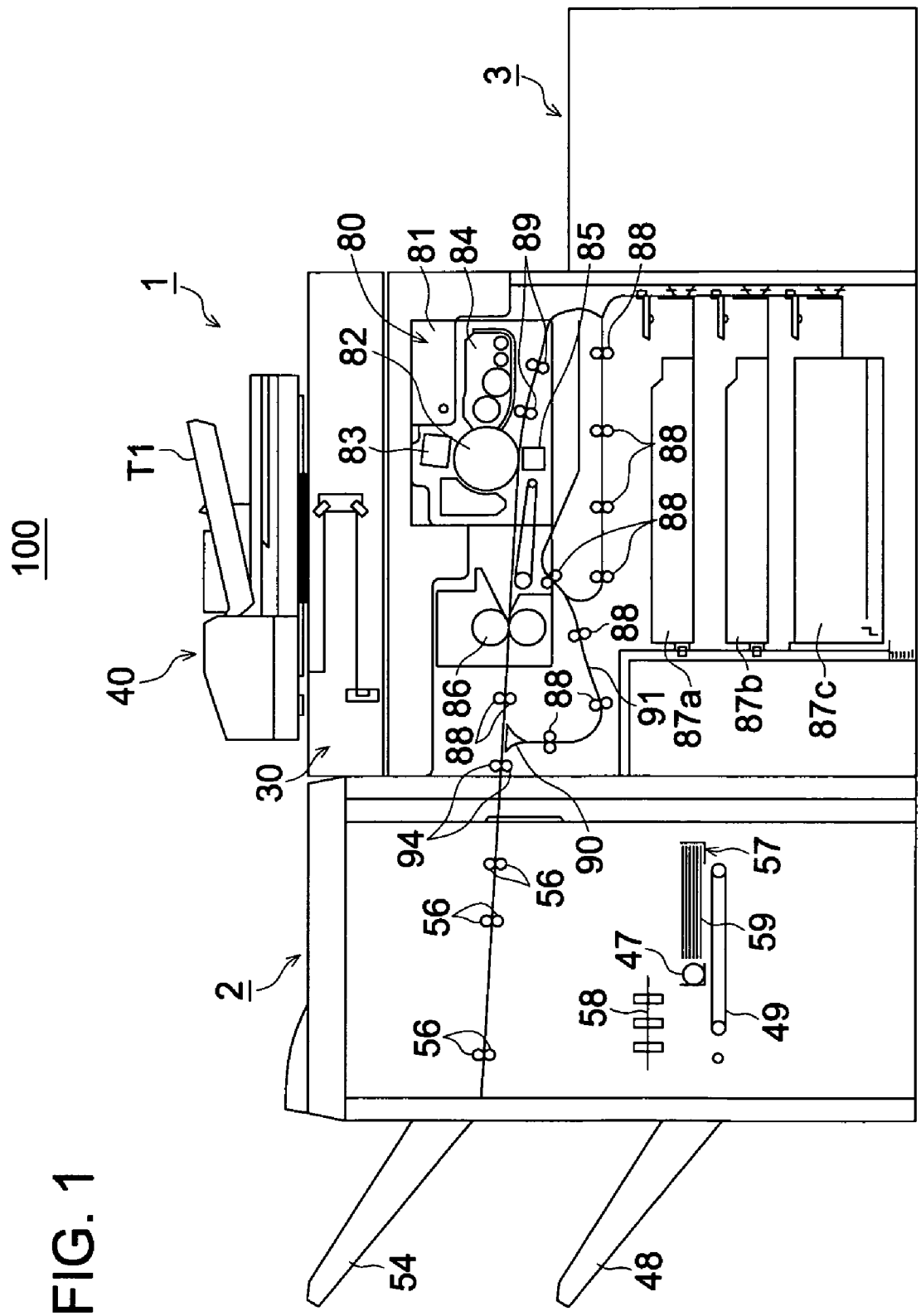
FIG. 1 illustrates a front view broadly showing a configuration of an image forming apparatus of the embodiment of the present invention.

An image forming apparatus equipped with an image forming system of an embodiment of the present invention will be described by referring to drawings below. FIG. 1 illustrates a front view broadly showing the configuration of the image forming apparatus of the embodiment of the present invention. As shown in FIG. 1, an image forming apparatus 100 comprises a main body 1, a finishing apparatus 2 optionally connected to the main body 1 and a large capacity tray unit 3. On the upper surface of the main body 1, an operation display section 20 and an ADF (Auto Document Feeder) 40 is arranged.

Figure 2:
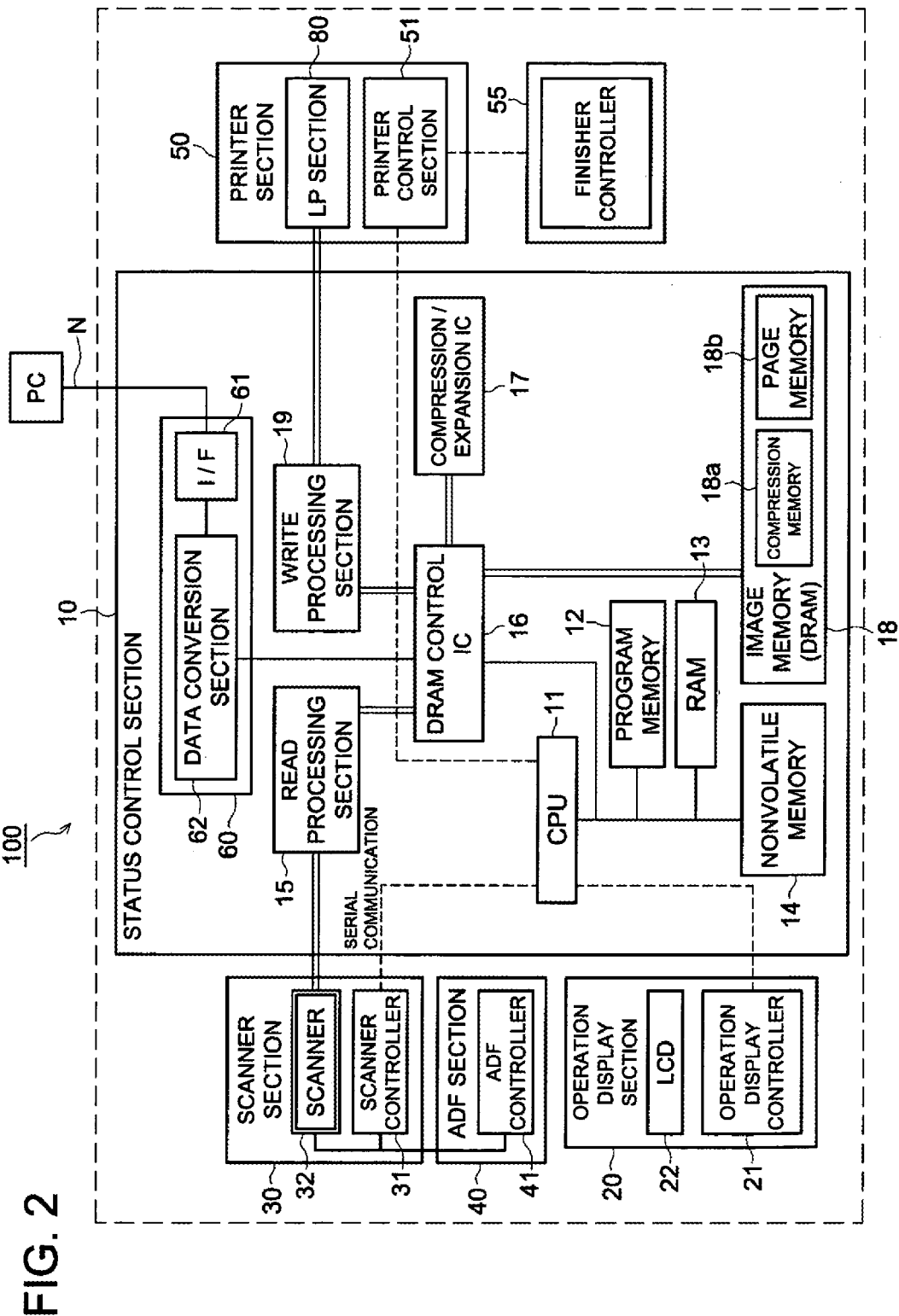
FIG. 2 illustrates a block diagram showing the main control configuration of the image forming apparatus illustrated in FIG. 1.

FIG. 2 illustrates a functional block diagram of an image forming apparatus 100. The main body 1 illustrated in FIG. 1 comprises a status control section 10, an operation display section 20, a scanner section 30, an ADF 40 and a printer section 50, which are shown in FIG. 2. Each section, which configures the image forming apparatus 100, will be described by referring to FIG. 2.

The status control section 10 comprises a CPU 11, a program memory 12, a RAM (Random Access Memory) 13, a nonvolatile memory 14, a read processing section 15, a DRAM (Dynamic Random Access Memory) control IC 16, a compression/expansion IC 17, an image memory (DRAM) 18 and a write processing section 19.

The CPU 11 reads out various processing programs such as a system program, an image forming processing program and an output processing program and expands them in the RAM 13. The expanded programs intensively control the operation of each section of the image forming apparatus 100.

For example, the CPU 11 stores setting information of each job inputted through the operation display section 20 to the job setting storage field of the RAM 13, and executes the job based on the stored setting information. The job means a series of operations regarding image formation such as printing. For example, when copying a plurality of documents, a series of jobs regarding the copy of the plurality of the documents is a job. When making plural sets of copies of the documents, a series of jobs regarding the formation of the plural sets of copies is a job.

The CPU 11 executes various processes such as an image forming process and an output process based on a read-out program and plays a role of the controller of the present invention. The image forming process in this specification means a process for forming an image on a recording medium according to the document image data. The output process in this specification means a process to be applied to the recording medium at least in either under process of the image forming process or after the process of the image forming process, other than the image forming process based on the document image data. With regard to the output process, for example, there is a case binding for forming a book by covering a bundle of recording media with a U-shaped cover sheet by attaching the cover sheet onto the bundle of recording media onto which the body text image is formed.

A program memory 12 comprises a semiconductor nonvolatile memory. The program memory 12 memorizes a system program installed into the image forming apparatus 100 and various process programs such as an image forming/processing program and an output process program, which are executable on the system program. The programs described above are stored in the program memory 12 in a form of a program code, which can be read by a computer. The CPU 11 successively executes the operation according to the program code.

The RAM 13 functions as a storage field for temporally storing a program read out from the program memory 12, input data or output data and a parameter in the various processes executed and controlled by the CPU 11. For example, the RAM 13 has a job setting information storage field for temporally storing the setting information of each job.

A nonvolatile memory 14 memorizes various setting data of the image forming apparatus 100. The read processing section 15 converts read out analog signals from the scanner section 30 to digital image data and outputs them to the DRAM control IC 16. This digital image data is a document image data of the present invention and the scanner section 30 and the read processing section 15 correspond to the data generation section or the data input section of the present invention. In the case of executing the case binding process, the scanner section 30 reads the cover sheet image and the body text image. Then the document image data, which is configured by the cover sheet image data and the body text image data is generated by means of that the read processing section 15 converts them to digital image data.

The DRAM control IC 16 compresses the document image data inputted from the read processing section 15 and document image data inputted from a print controller 60 based on the control from the CPU 11 by using a compression/expansion IC 17. Then the DRAM control IC 16 writes the compressed image data into the image memory 18a of the image memory 18 and temporary memorize them. When there is a instruction for outputting the image data from the CPU 11, the DRAM control IC 16 expands the document image data memorized in the compression memory 18a, to which the output instruction is issued and outputs them to the write processing section 19. In this case, when the CPU 11 issues a control signal for executing a synthesize process, the DRAM control IC 16 is arranged to expand the document image data by using the compression/expansion IC 17, to overwrite the peculiar image data in the nonvolatile memory 14 and to output them to the write processing section 19. Then the DRAM control IC 16 outputs the control data inputted from the print controller 60 to the CPU 11.

The compression/expansion IC 17 is an IC for conducting a compression process and an expansion process of the image data under the control of the DRAM control IC 16.

The image memory 18 is configured by a DRAM and includes the compression memory 18a and a page memory 18b. The compression memory 18a temporary memorizes the image data compressed by the compression/expansion IC 17 under the control of the DRAM control IC 16.

The write processing section 19 generates PWM (Pulse Width Modulation) signals based on the image data inputted from the compression/expansion IC 17 and outputs them to the printer section 50.

The operation display section 20 is an input section of the present invention and comprises an operation display controller 21 and a LCD 22.

The operation display controller 21 receives display signals from the CPU 11 and conducts the display control of the LCD 22. Further the operation display controller 21 outputs operation signals inputted from a touch panel on the LCD 22 to the CPU 11.

The LCD 22 displays various setting screens, image status indication and operation status of various functions according to the instruction of display signals inputted from operation display controller 21. A pressure sensitive system (a resistance sensitive layer system) touch panel is configured by disposing transparent electrodes in a lattice shape on the screen surface of the LCD. The X-Y coordinates of the forced point where a finger or a touch pen presses down is detected by checking the voltage value and the touch panel is arranged to outputs a position signal as an operation signal to the operation display controller 21.

The operation display section 20 also includes various numerical buttons (not shown), a function button for switching operation modes and various operation buttons such as a start button. The operation display section 20 is arranged to output operation signals generated by button operation from operation display controller 21 to the CPU 11.

The operation display section 20 is arranged so that the switching instruction of various print modes such as a normal print mode and a case binding mode are inputted. The CPU 11 is arranged to read out a program from the program memory 12 corresponding to the inputted mode and to control respective sections of the image forming apparatus. When the mode has been changed to the case binding mode, a shift instruction for shifting the print area of the document image data is expected to be inputted in the operation display section 20. When the print mode is set at the case binding mode and a wide paper sheet, the size of which is larger than a standard size is used, in general, a standard size print area is arranged to be disposed substantially at a center of the wide paper sheet. Then, when the shift instruction is inputted, the print area is shifted in the width direction of the recording medium.

Here, the shift instruction shifts only the body text image corresponding to the body text image data of the document image data to one end of the recording medium and the shift instruction does not shift the cover sheet image corresponding to the cover sheet data.

The CPU 11 is arranged to control the printer section 50, which will be described later and to form an image based on the shift instruction inputted from the operation display section 20 so that only a body text image corresponding to the body text image data is shifted to one end of the recording media while a cover sheet image corresponding to the cover sheet image data is not shifted.

The scanner section 30 comprises a scanner controller 31 and a scanner 32. The scanner controller 31 drives and controls each section of the scanner 32 when receiving a control signal from the CPU 11. The scanner 32 comprises platen glass, a CCD (Charge Coupled Device) and a light source. The scanner 32 is arranged to read the image of the document by irradiating or scanning the light beams emitted from the light source onto the document, while forming a photo image onto the CCD and converting the photo image into electric signals. Then the scanner 32 outputs the read analog image signals to the read processing section 15.

An ADF 40 includes an ADF controller 41 for controlling each section of the ADF 40 based on control signals inputted from the CPU 11. The ADF 40 also automatically feeds the document placed on a document tray T1 (refer to FIG. 1) onto the platen glass of the scanner section 30.

A printer section 50 is an image forming section of the present invention for forming an image onto a recording medium based on the document image data inputted from the CPU 11. The printer section 50 comprises a printer control section 51 and a LP (Laser Printer) section 80.

The printer control section 51 controls operation of each section of the LP section 80 when receiving control signals from the CPU 11. The printer control section 51 detects the occurrence of jam in the LP section 80, a jam location and release from the jam, and outputs this detected jam information to the CPU 11. The printer control section 51 counts the number of copy paper sheets fed each job and outputs the number to the CPU 11. Further, the printer control section 51 relays the data for communication between the CPU 11 and the finisher controller 55.

As shown in FIG. 1, the LP section 80 comprises a LD 81(Laser Diode), a photosensitive drum 82, a charger 83, a developer 84, a transfer section 85, a fixing section 86, storage-trays 87a-87c for storing recording media, feeding rollers 88 for conveying the recording media along a conveyance path in the LP section 80 as a conveyance section, registration rollers 89, various rollers such as eject rollers 94, a conveyance path switching board 90 and a reverse section 91. The conveyance section of the LP section 80 feeds the recording media from any one of the storage trays 87a-87c, which store the recording media to be used in the job and conveys the recording media onto the conveyance path based on the control from the printer control section 51. Also, based on the control from the printer control section 51, the charger 83 charges the surface of the photosensitive drum 82, the LD 81 forms an electro-static latent image by irradiating laser beams on the surface of the photosensitive drum 82 based on PWM signals inputted from the write processing section 19 and the developer 84 places toner onto the area of the surface of the photosensitive drum 82, which includes the latent image. The transfer section 85 transfers toner onto the recording media conveyed from any one of the storage trays 87a-87c to form an image. The fixing section 86 fixes the image onto the recording media. Then eject rollers 94 eject the recording media, onto which an image has been formed, to a finishing apparatus 2. When conducting dual surface printing, the recording media, onto one side of which the image has been printed are fed to reversing section 91 through the conveyance switching board 90 and a reverse path. The reversing section 91 reverses the recording media. Then the recording media is conveyed to the photosensitive drum 82 to form an image onto the surface of the recording media, which have been reversed. After fixing the image, the eject rollers 94 eject the recording media to the finishing apparatus 2.

A plurality of sensors (not shown) is provided above the conveyance path of the LP section 80. These sensors generate sensor signals when a recording medium passes through the conveyance path and outputs the sensor signals to the printer control section 51. The printer control section 51 detects that paper sheet jam occurs between two sensors and outputs jam detected information to the CPU 11 when a next sensor signal supposed to be detected does not turn on after passing a certain time period since a recording medium passed by a certain sensor.

A finishing apparatus 2 includes a finisher controller 55 for controlling each section of the finishing apparatus 2 based on a control signal inputted from the CPU 11 through the printer control section 51. The finisher controller 55 comprises a CPU, a system program corresponding to the finishing apparatus 2, a program memory for memorizing various process programs, which are executable on the system program and a RAM. As illustrated in FIG. 1, the finishing apparatus 2 includes plural pairs of conveyance rollers 56, which convey recording media to an eject tray 54 when an image is formed in a normal mode. In the case of case binding mode, among the plural pairs of conveyance rollers 56, a pair of conveyance rollers 56 positioned in substantially center of the plural pairs of conveyance rollers 56 temporarily stops the conveyance of the recording medium onto which a body text image is recorded (from now on it will be called a body text recording medium) and the recording medium onto which a cover sheet image is recorded (from now on it will be called a cover sheet recording medium). The body text recording medium, which is temporarily stopped is conveyed by the first conveyance apparatus (not shown) to a document receiving section 57 and placed thereon. On the other hand, the cover sheet recording medium, which has temporarily stopped is conveyed by the second conveyance apparatus 58 to the place positioned below the body text recording medium in the document receiving section 57. An adhesive agent applying section 47, in which a hot-melt adhesive for book binding is set is provided on the side of the document receiving section 57. Thus, the adhesive agent is applied to one end of the body text recording medium in the document receiving section 57. After that, by removing a partition board 59 supporting the body text recording medium, the body text recording medium is placed onto the cover sheet recording medium. Then, a cover sheet folding mechanism (not shown) operates to fold the cover sheet recording medium, a spine cover portion of the cover sheet recording medium glues to an adhesive applying portion of the body text recording medium and the spine cover is formed. After that, bookbinding is completed by folding the rest of the cover sheet recording medium for the back cover of the book. A conveyance belt conveys the bound book to eject them to a bound book eject tray 48.

The CPU in the finisher controller 55 ejects the recording medium ejected from the printer section 50 to an eject tray 54, binds a book and ejects the bound book to a bound book eject tray 48 by driving and controlling each section of the finishing apparatus 2 based on the combination work with a program stored in the program memory based on the inputted control signals.

A print controller 60 comprises an I/F 61, a data conversion section 62. The I/F 61 is a communication interface for connecting the image forming apparatus with communication network such as a NIC (Network Interface Card) and a modem, and conducts data transmission and data receiving with external apparatus such as PC. The data conversion section 62 converts the image data inputted from the PC through the I/F 61 into the image data, which can be printed by the image forming apparatus 100 by applying a predetermined page description language, and outputs the image data together with the control data to the DRAM control IC 16. This digital image data is a document image data of the present invention, and the PC and the print controller 60 are respectively a data generation section and a data input section. Namely, in an embodiment of the present invention, an image forming apparatus 100 having two systems of data generation sections or data input sections having a data generating section or a data input section including a PC and a print controller 60 and a data input section including a scanner section 30 and a read processing section 15 is described as an example of the present invention.

When generating the document image data having cover sheet image data and body text image data by using the PC, a shift instruction can be given to the generated document image data on the PC. In this case, the document image data and the shift instruction are arranged to be outputted to the print controller 60 and transmitted to the CPU 11 through the DRAM control IC 16.

The CPU 11 so controls the printer section 50 based on the shift instruction as to shift only the body text image corresponding to the body text image data of the document image data to one end of the recording medium and not as to shift the cover sheet image corresponding to the cover sheet image data when forming an image.

As a result, only body text image corresponding to the body text image data is shifted based on the shift instruction. Thus, it becomes possible to suppress that the cover sheet image corresponding to the cover sheet image data is shifted same length as the shift amount of the body text image. It also becomes possible to provide output suitable for bookbinding.

When generating the document image data including the cover sheet image data and the text image data by using the PC, a user may input the shift instruction against the document image data and a program stored in a ROM (not shown) is executed to apply image processing to the body text image data so as to shift the body text image on the recording medium based on the shift instruction inputted to the controller provided in the PC. The cover sheet image data and the body text image data to which the image processing has been applied are transmitted from the PC through the I/F to the print controller 60. In this case, even though a shift process has not been conducted when generating the body text image, if the image is formed based on the body text image data to which the image processing has been applied, then the body image is formed so that the body text image is shifted on the recording medium. In this case, the controller and the ROM correspond to the image processing section and the I/F of the PC corresponds to the transmission device. Namely, in this case the PC itself corresponds to the image forming control apparatus of the present invention.

Concretely, when the PC itself is an image forming control apparatus, the PC itself comprises a data generation section for generating the document image data including the cover sheet image data and the body text image data, an input section for inputting a shift instruction for shifting the printing area of the body text image based on the shift instruction, an image processing for applying the process to the document image data so that the cover sheet image corresponding to the cover sheet image data is not shifted, and an I/F for transmitting the document image data to which the processing has been applied by the image processing section to the image forming apparatus. As these sections function same as those of image forming apparatus 100, the PC can conduct the image processing for the document image data.

Next, the actions associated with the embodiment of the present invention caused by the execution of the control program of the present invention will be described below.

Figure 3:
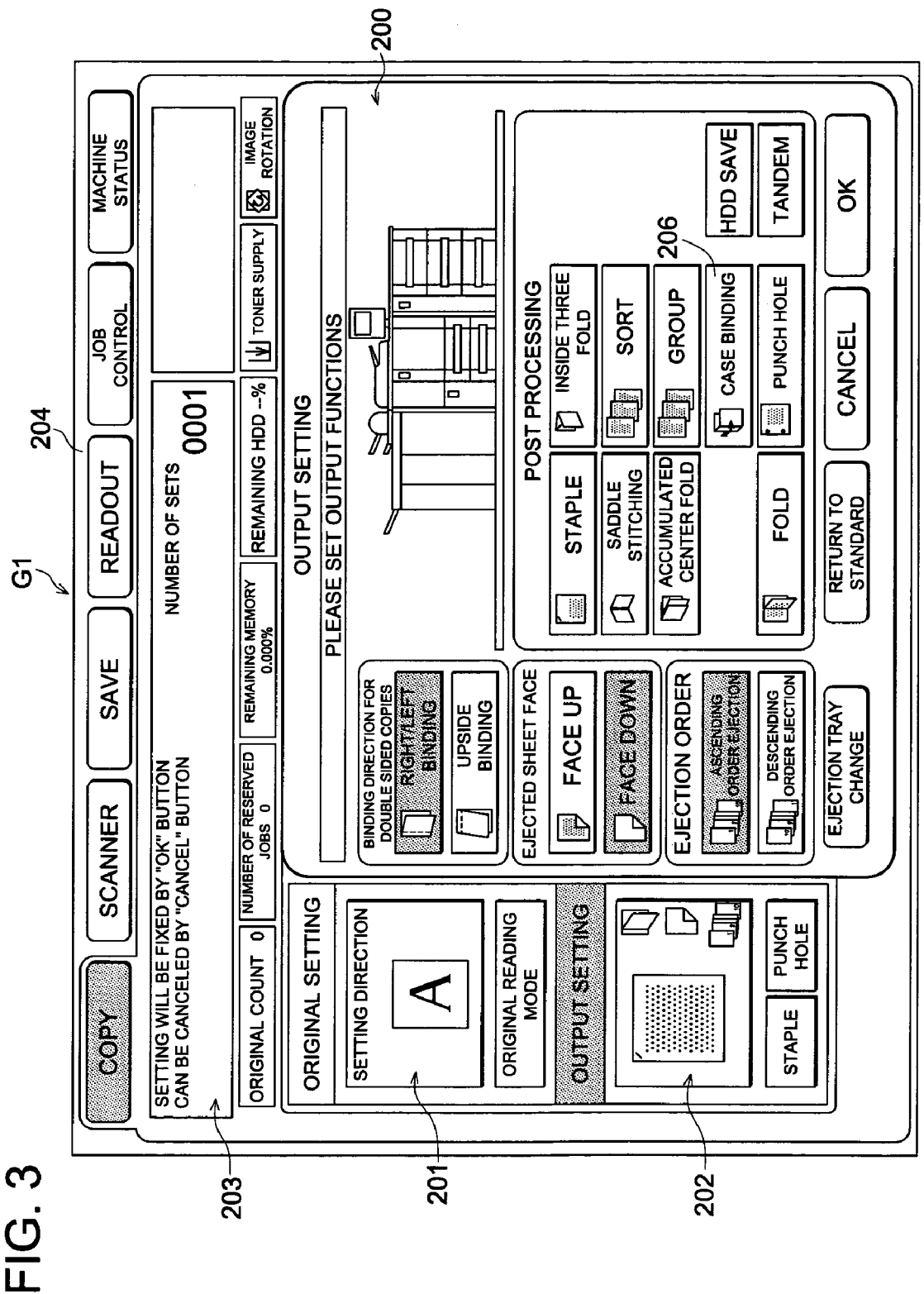
FIG. 3 illustrates an explanation drawing for showing a screen example of an operation display section equipped with the image forming apparatus illustrated in FIG. 1.

FIGS. 3-6 illustrates explanation drawings for showing setting screen examples displayed on the operation display section 20 before image formation. As illustrated in FIG. 3, a setting screen G1 includes an output setting column 200 for displaying each item of output setting, a document setting column 201 for displaying the status of the document, a status display column 202 for displaying the current output setting status, an apparatus status column 203 for displaying the status of the image forming apparatus 100 and a tub column 206 for switching a display tub.

Figure 4:
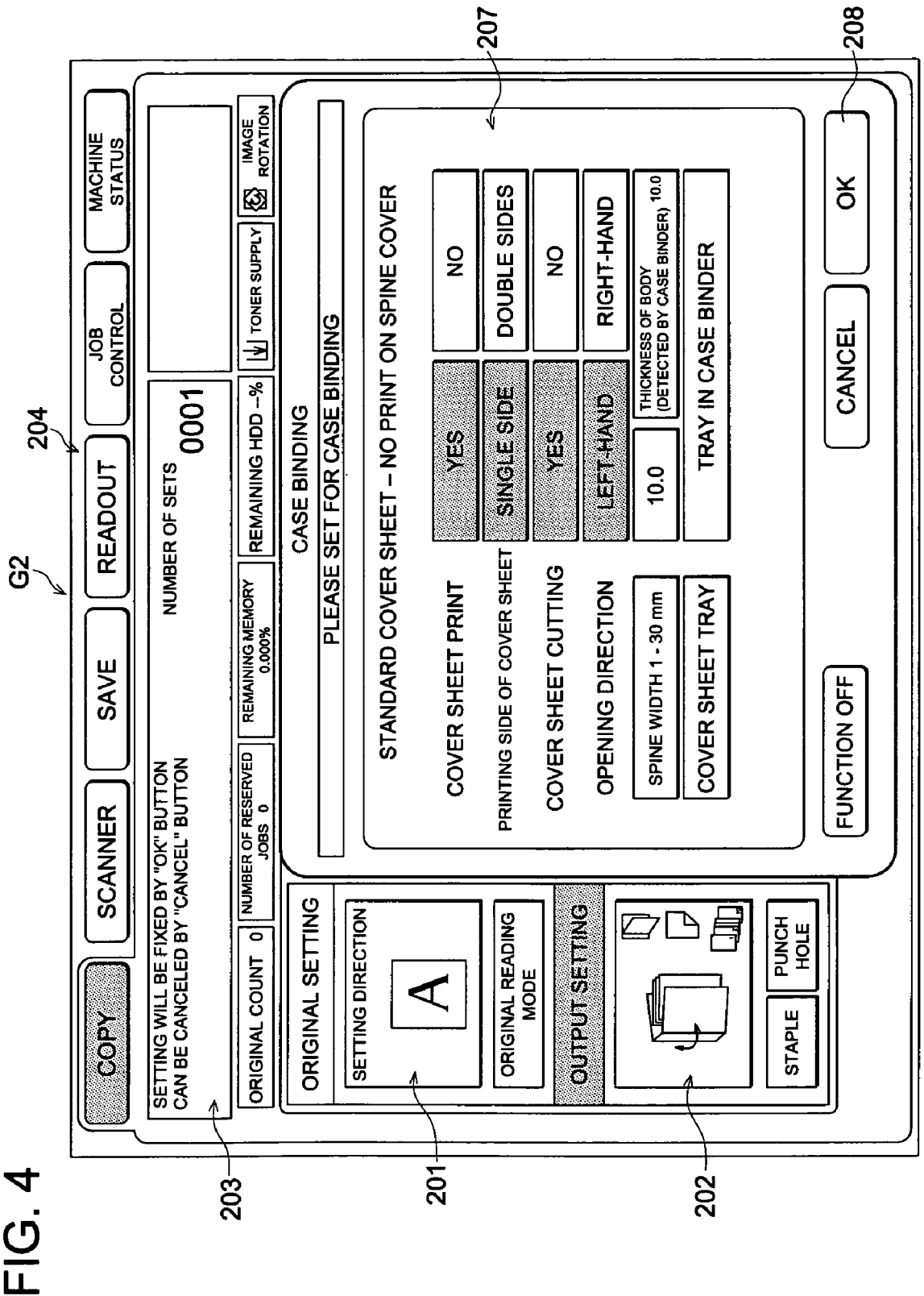
FIG. 4 illustrates an explanation drawing for showing a screen example of an operation display section equipped with the image forming apparatus illustrated in FIG. 1.

Then, when the user of the image forming apparatus 100 touches a case binding button 206 in the output setting column 200, the image formation in the case binding mode is decided and the operation display section 20 displays a setting screen G2 as illustrated in FIG. 4. In the setting screen G2, the output setting column 200 in the setting screen G1 will be switched to a case binding setting column 207 for setting items for the case binding. In the case of the case binding setting column 207, following each condition setting will be asked; whether cover sheet printing is required; whether the cover sheet printing is single sided printing or double sided printing; whether cover sheet cutting is required; whether the open direction is left-open or right-open; and setting each items such as selection of the spine width and cover sheet tray.

Figure 5:
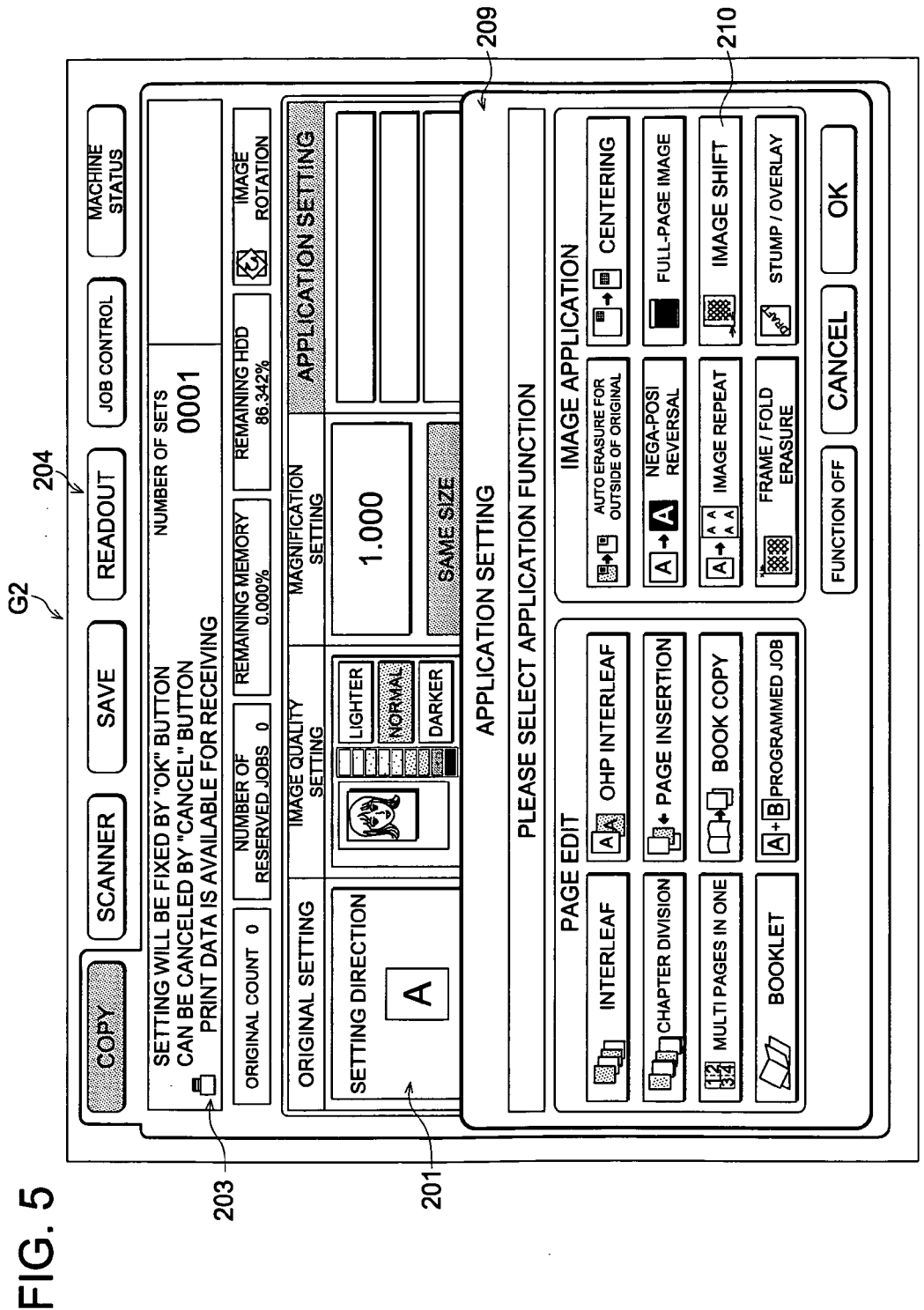
FIG. 5 illustrates an explanation drawing for showing a screen example of an operation display section equipped with the image forming apparatus illustrated in FIG. 1.

When the user completes the setting of each item on the screen and touches an OK button, a setting screen G3 as illustrated in FIG. 5 will be displayed on the operation display section 20. In the setting screen G3, an application setting window 209 is open. The application setting window 209 is arranged to conduct page edit and to select various application functions for image application. With regard to the application function of page edit, for example, there are interleaf, OHP interleaf, chapter division, page insertion, multi page in one, book copy, booklet, programmed job. On the other hand, with regard to the application function of the image application, for example, auto erasure for outside of original, centering, negative-positive reversal, full-page image, image repeat, image shift, binding margin, frame/fold erasure and stump/overlay.

Figure 6:
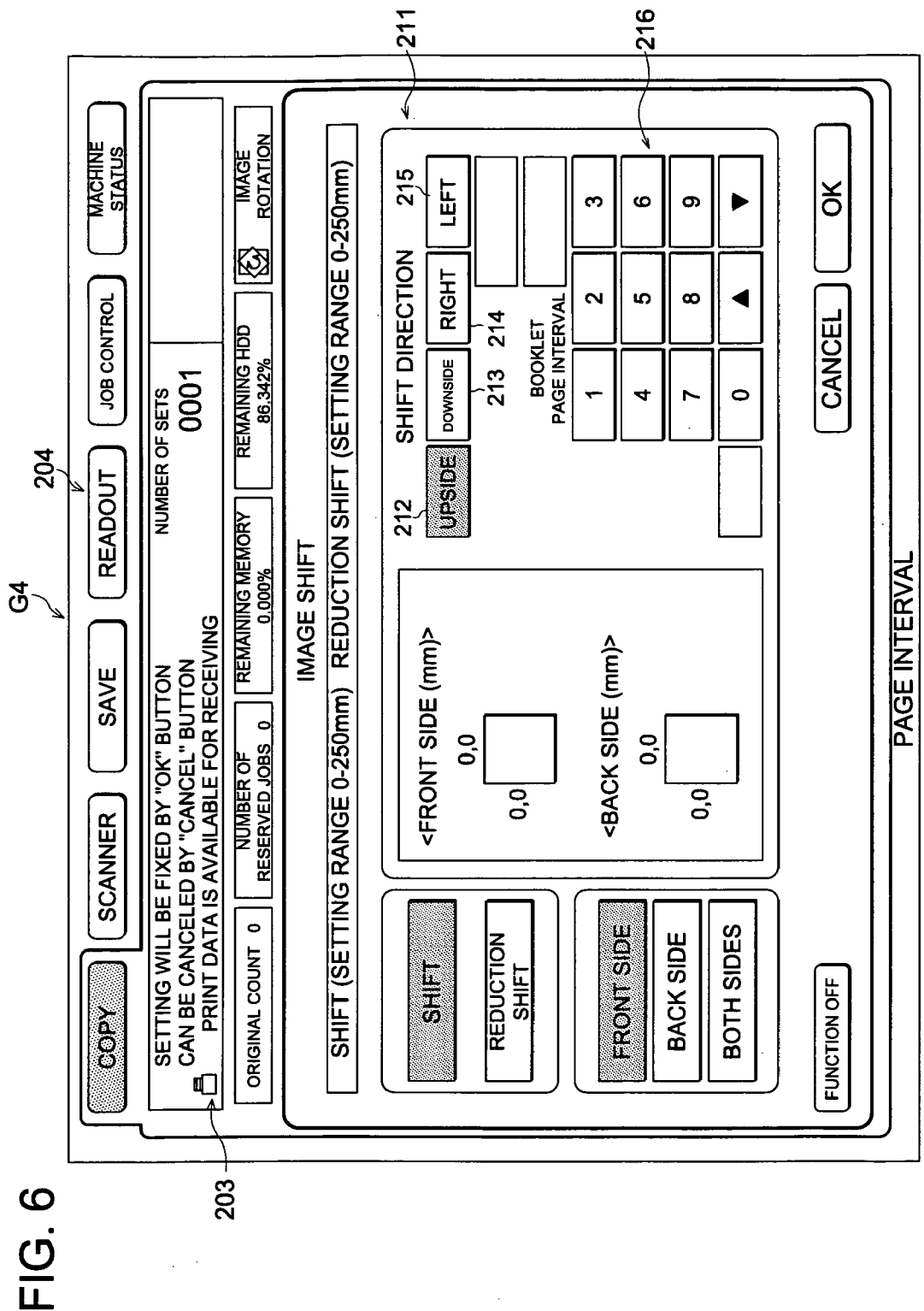
FIG. 6 illustrates an explanation drawing for showing a screen example of an operation display section equipped with the image forming apparatus illustrated in FIG. 1.

When the user of the image forming apparatus 100 touches the image shift button 210 of the application setting window 209, a setting screen G4 illustrated in FIG. 6 is displayed in the operation display section 20. In the setting screen G4, a shift setting window 211 is open. This shift setting window 211 is arranged to set the shift direction and a shift amount of the print area of the image corresponding to the document image data. In the shift setting window 211, provided are direction buttons (an UPSIDE button 212, a DOWNSIDE button 213, a Right button 214 and a LEFT button 215) for setting the shift direction and ten keys 216 for setting the shift amount. Touching these buttons and keys set the shift direction and the shift amount.

Figure 7:
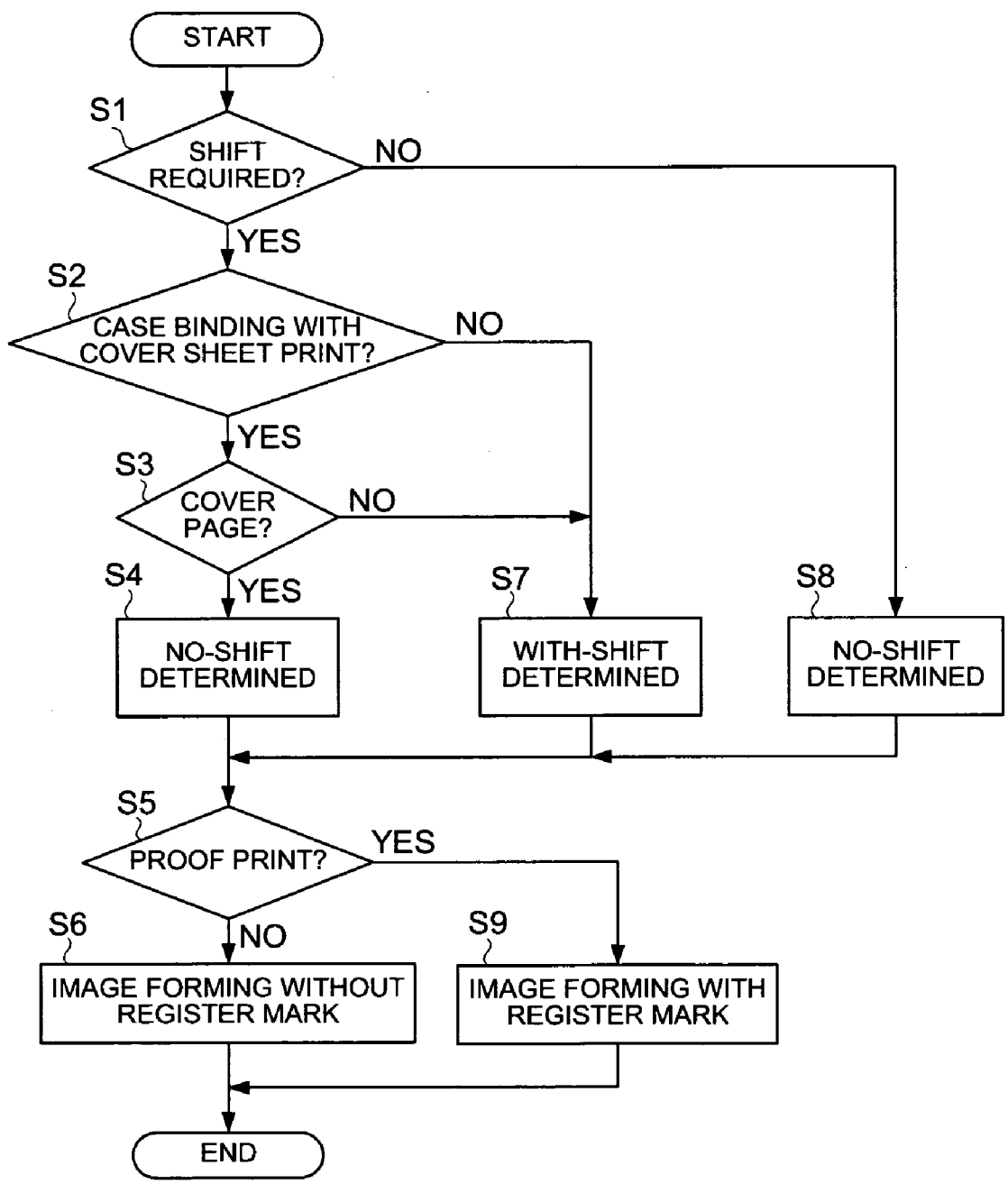
FIG. 7 illustrates a flowchart showing an example of a program to be executed in the image forming apparatus shown in FIG. 1.

When completing a series of settings and the input operation of the image formation start instruction into the operation display section 20, the CPU 11 starts to read out a program of the present invention from the program memory and executes them. FIG. 7 illustrates a flowchart of the program.

As illustrated in FIG. 7, at the step S1, the CPU 11 determines whether a shift is required by checking whether the shift amount for the document image data of the image to be formed from now on has been set. When the shift amount has been set, the operation of the CPU 11 proceeds to the step S2. When the shift amount has not been set yet, the operation of the CPU 11 proceeds to the step S8. Namely, the case that the operation proceeds from the step S1 to the step S2 corresponds to the input step of the present invention for inputting the shift instruction to shift the print area of the document image data.

In the step S2, the CPU 11 determines whether the case binding process mode and the cover sheet printing have been set. When the case binding process mode and the cover sheet printing have been set, the operation of the CPU 11 proceeds to the step S3. Otherwise, the operation of the CPU 11 proceeds to the step S7.

In the step S3, the CPU 11 determines whether the cover sheet page is generated by forming an image from the cover sheet image data of the document image data onto the recording medium to be immediately following. When there is a cover page, the operation of the CPU 11 proceeds to the step S4. When there is not a cover page, the operation of the CPU 11 proceeds to the step S7.

In the step S4, the CPU 11 determines that no-shift operation is applied to the cover sheet image data.

In the step S5, the CPU 11 determines whether the image formation to be executed from now on is proof print. If the image formation to be executed is not proof print, the operation of the CPU 11 proceeds to the step S6. When the image formation to be executed is proof print, then the operation of CPU 11 proceeds to the step S9.

In the step S6, the CPU 11 executes respective image formations without placing register marks for indicating the cutting positions and the operation of the CPU 11 proceeds to the END.

In the step S7, the CPU 11 determines to apply the shift operation including the set shift amount and the set shift direction to the body text image data.

In the step S8, the CPU 11 determines not to execute the shift operation for all of the document data.

In the step S9, the CPU 11 places the register marks onto the four corners of each image, executes image formation and proceeds to the END.

From the step S1 to the step S9 are examples of the image forming steps of the present invention. The CPU 11 forms the image so that the CPU 11 shifts only body text image corresponding to the body text image data of the document image data on the recording medium and does not shift the cover sheet image corresponding to the cover sheet image data of the document image data based on the shift instruction, which has been inputted in the input step.

Figure 8:
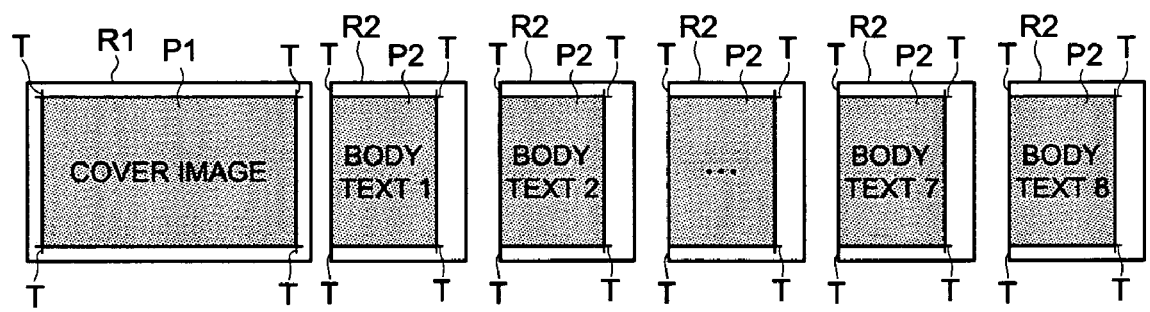
FIG. 8 illustrates an explanation drawing showing the relation between a recording medium onto which an image is formed by the image forming apparatus illustrated in FIG. 1 and a print area.

For example, when the shift direction is the left direction and the shift amount is the distance to the left end, as shown in FIG. 8, a print area P1 corresponding to the cover sheet image data is not shifted and disposed substantially center of a cover sheet recording medium without shift. In this case, the registered marks T are given and placed on the four corners of the print area P1.

On the other hand, a print area P2 corresponding to the body text image data is shifted and disposed at the left end of the body text recording medium R2. In this case, the registered marks are placed on the four corners of the print area P2. Meanwhile, the register marks at the left end are superimposed on the recording medium, the register marks at the left end side are omitted.

Then, by executing these steps in every page, the images corresponding to all of the document image data can be formed.

After that, the finishing apparatus 2 applies the case binding process to the cover sheet recording medium R1 and the body text recording medium R2. Then the finishing apparatus 2 ejects the cover sheet recording medium R1 and the body text recording medium R2 in a booklet style onto a bookbinding eject tray 48.

As described above, according to the embodiment of the present invention, even though the shift instruction is inputted in the operation display section 20, only the body image corresponding to the body image data is shifted on the body text recording medium R2 and the image is formed so that the cover sheet image corresponding to the cover sheet image data is not shifted. Thus, the cover sheet image is formed substantially center of the cover sheet recording medium R1 and the body text image is formed so that the body text image is shifted to one end of the body text recording medium R2. As described above, since the body text portion shift is not reflected onto the cover sheet portion, the output suitable for the bookbinding becomes possible.

The present invention is not limited to the above embodiment and various changes and modification may be made without departing from the scope of the invention.

Figure 9:
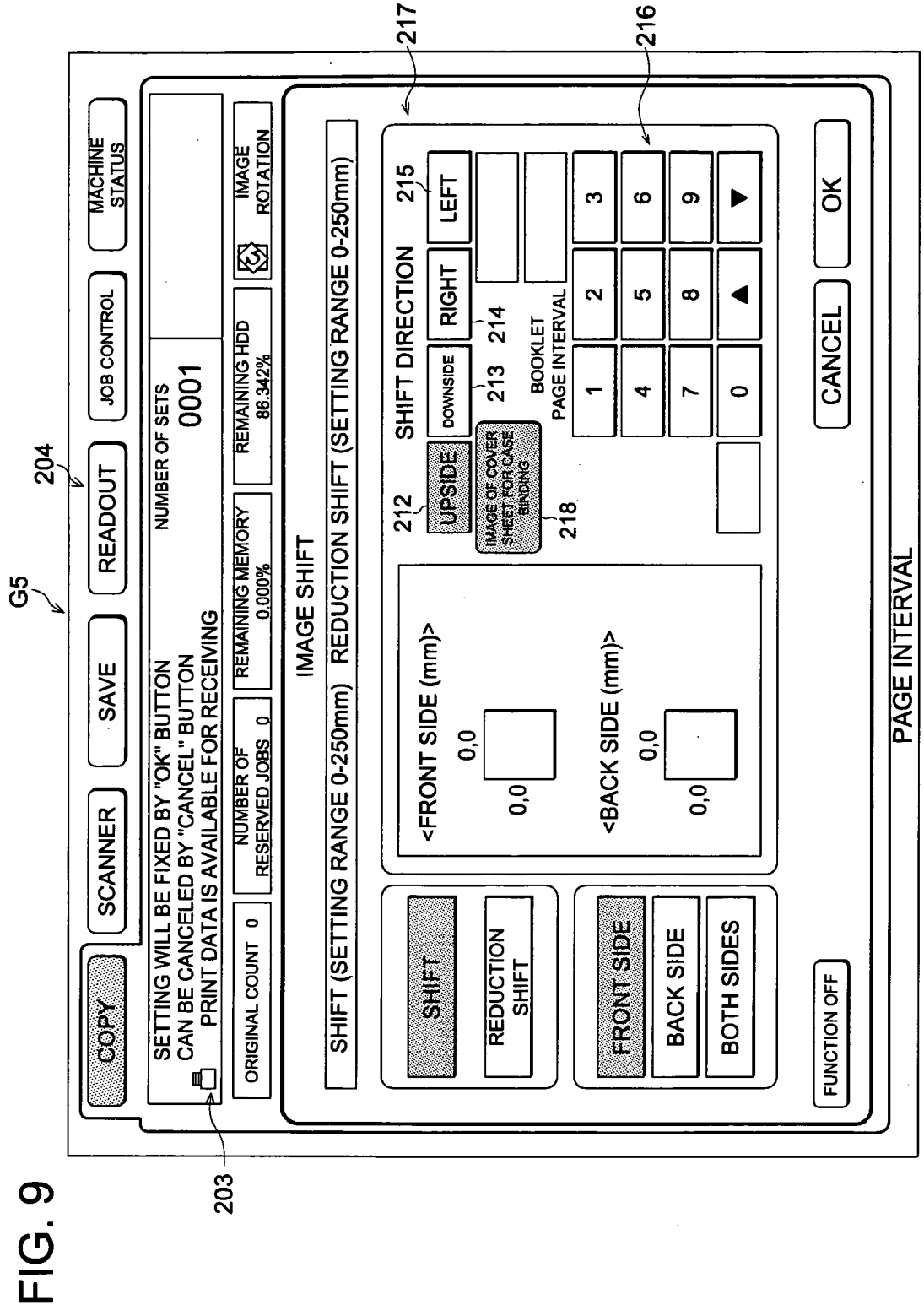
FIG. 9 illustrates an explanation drawing for showing a screen example of an operation display section equipped with the image forming apparatus illustrated in FIG. 1.

For example, the present invention describes the case that the shift instruction is applied only body text image data. However, a cover sheet shift instruction for shifting the print area of the cover sheet image data may be inputted in the operation display section 20. Concretely describing, after inputting the shift instruction on the setting screen G4 illustrated in FIG. 6, for example, the setting screen G5 illustrated in FIG. 9 is displayed in the operation display section 20. In the setting screen G5, a cover sheet shift setting window 217 to which the cover sheet shift instruction for shifting the print area of the cover sheet image data is inputted is open. The cover sheet shift setting window 217 includes the direction buttons (an UPSIDE button 212, DOWNSIDE button 213, a RIGHT button 214 and a LEFT button 215) for setting the shift direction and ten keys 216 for setting the shift amount same as the shift setting window 211. Touching these switches can set the shift direction and the shift amount. In order to allow the user of the image forming apparatus to recognize the differences between the shift setting windows 211 and 217, a mark 218 "IMAGE FOR COVER SHEET FOR CASE BINDING" is provided in the cover sheet shift setting window 217.

Figure 10:
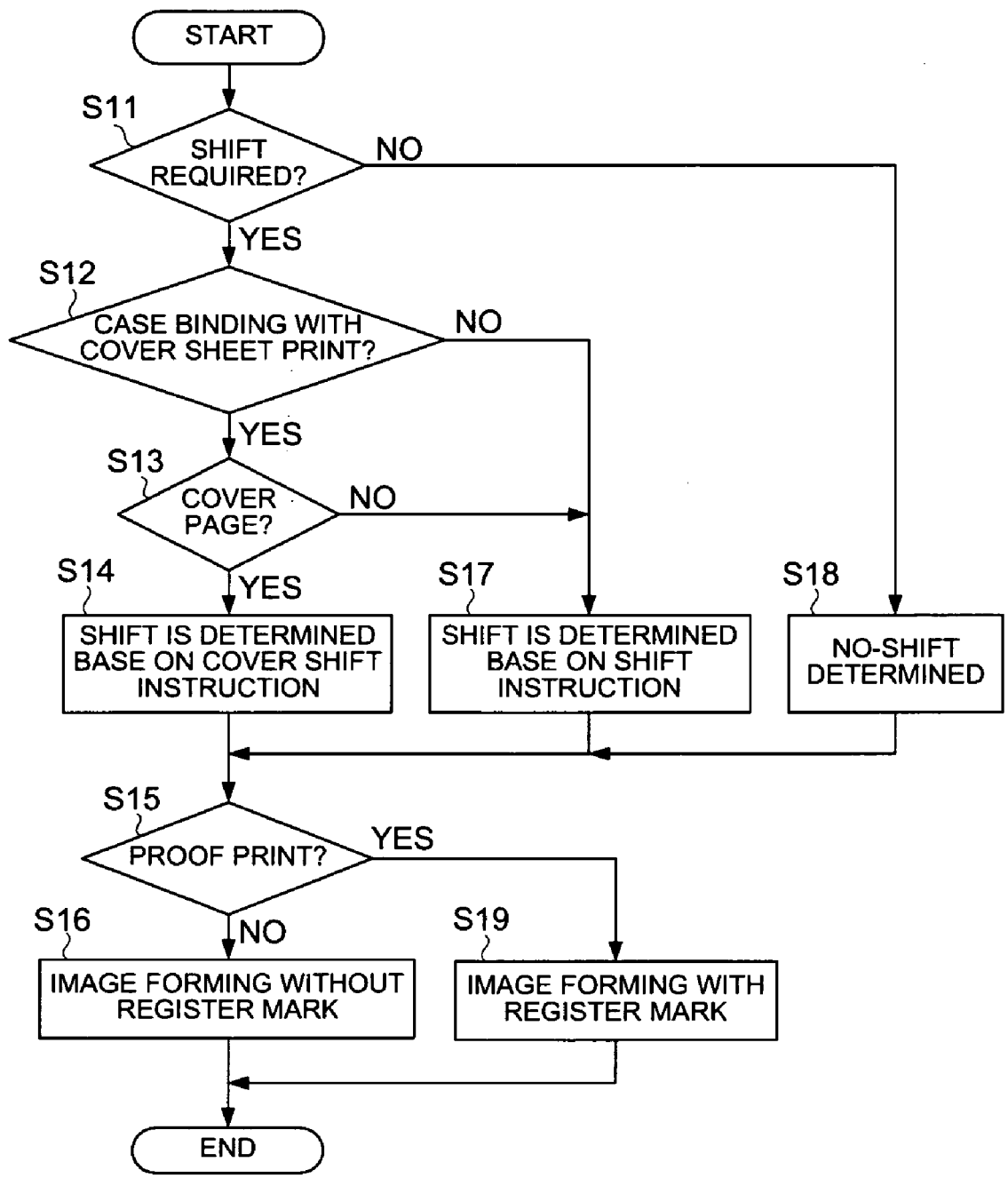
FIG. 10 illustrates a flowchart showing an example of a program to be executed in the image forming apparatus shown in FIG. 1.
Figure 11:
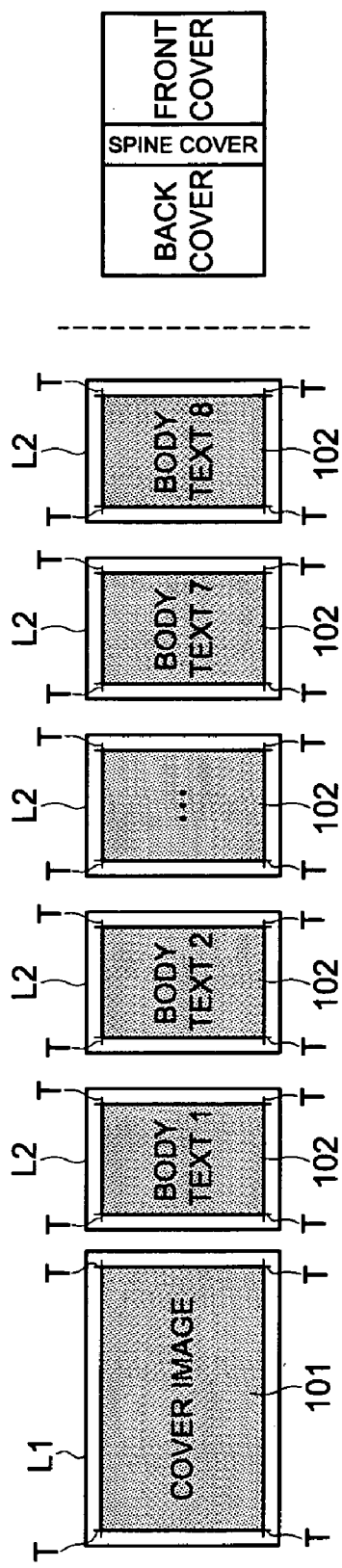
FIG. 11 illustrates an explanation drawing showing the relation between a recording medium onto which an image is formed by a conventional image forming apparatus and a print area.
Figure 12:
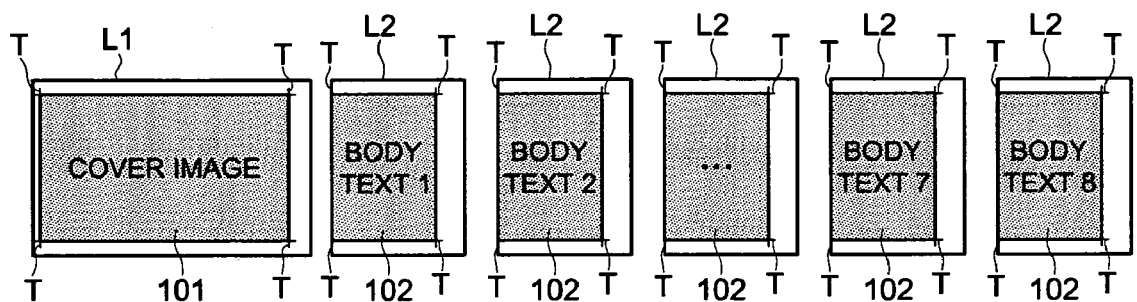
FIG. 12 illustrates an explanation drawing showing the relation between a recording medium onto which an image is formed by a conventional image forming apparatus and a print area.

When the shift instruction and the cover sheet shift instruction have been inputted as described above and the image formation start instruction is inputted in the operation display section 20, the CPU 11 reads out a program from the program memory and executes the program. FIG. 10 illustrates the flowchart of the program.

As illustrated in FIG. 10, in the step S11, the CPU 11 determines whether a shift operation is required or not by checking whether the shift amount has been set in the document image data to be used for the image formation from now on. When the shift amount has been set, the operation of the CPU 11 proceeds to the step S12. When the shift amount has not been set yet, the operation of the CPU 11 proceeds to the step S18.

In the step S12, the CPU 11 determines whether the case binding process mode and the cover sheet print have been set with the document image data. When the case binding process mode and the cover sheet print have been set with the document image data, the operation of the CPU 11 proceeds to the step S13. When the case binding process mode and the cover sheet print have not been set with the document image data, then the operation of the CPU 11 proceeds to the step S17.

In the step 13, the CPU 11 determines whether the cover sheet page is formed or not by checking whether the image is formed onto immediately following recording medium by the cover sheet image data of the document image data. When the CPU 11 determines that there is a cover sheet page, the operation of the CPU 11 proceeds to the step S14. When the CPU 11 determines that there is no cover sheet page, the operation of the CPU 11 proceeds to the step S17.

In the step S14, the CPU 11 determines that the shift amount and the shift direction, which have been set in the cover sheet shift instruction, are applied to the image when the image is formed.

In the step S15, the CPU 11 determines whether the image formation is proof print or not. When the CPU 11 determines that it is not proof print, the operation of the CPU 11 proceeds to the step S16. When the CPU 11 determines that it is proof print, the operation of the CPU 11 proceeds to the step S19.

In the step S16, the CPU 11 executes the image formation without register marks for indicating the cutting position, and the operation of the CPU 11 proceeds to the END.

In the step S17, the CPU 11 determines that the shift amount and the shift direction, which have been set, are applied to the body text image when the image is formed.

In the step S18, the CPU 11 determines that the shift operation is not applied to all the document image data.

In the step S19, the CPU 11 places the register marks at the four corners of the image, executes the image formation and the operation of the CPU 11 proceeds to the END.

Accordingly, the shift conditions for the cover sheet image can also be set apart from the body text image and various image formations become possible.

Namely, the cover sheet image corresponding to the cover sheet image data can be shifted based on the cover sheet shift instruction, it can be restrained that the cover sheet image corresponding to the cover sheet image data is shifted the same distance as the shift amount of the body text image. Since the shift suitable for the cover sheet can also be conducted, the output suitable for bookbinding becomes possible. Further, since the shift process for the body text image and the shift process for the cover sheet image can be independently set, it can be restrained that the cover sheet image is shifted the same distance as the shift amount of the body text image. Further, since the shift suitable for the cover sheet can be conducted, the output suitable for the bookbinding becomes possible.

When the print area is set smaller than the size of the recording medium, for example when cutting off the outside of the print area, the suitable output becomes possible. Particularly, when forming the booklet by covering the recording medium with a cover sheet to have a spine (made into U-shape), a suitable output becomes possible.

In the embodiment of the present invention, only a case that the shift instruction and the cover sheet shift instruction are inputted in the operation display section 20 is described. However, it is apparent that even when the body image shift instruction and the cover sheet shift instruction are given to the document image data inputted from the PC, the image can be formed on the same process.

What is claimed is:

1. An image forming apparatus which forms body text images on a plurality of recording media based on body text image data, forms a cover sheet image on a U-shaped cover sheet based on cover sheet image data, and covers a bundle of recording media on which the body text images are formed with the U-shaped cover sheet on which the cover sheet image is formed, to perform case binding for forming a book, the image forming apparatus comprising:
  a data input section to input document image data including the cover sheet image data and the body text image data;
  an image forming section to form the body text images on the recording media and to form the cover sheet image on the cover sheet, based on the body text image data and the cover sheet image data included in the document image data, respectively;
  an input section which is configured to display a first screen for inputting a body text image shift instruction for shifting a print area of the body text image data away from a reference print position of the body text images on the recording media by a variably specifiable desired amount and in a variably specifiable desired direction which are variably specifiable by a user via an input to the first screen of the input section, and which is configured to display a second screen for inputting a cover sheet image shift instruction, independently from the body text image shift instruction, for shifting a print area of the cover sheet image data away from a reference print position of the cover sheet image on the cover sheet by an independent variably specifiable desired amount and in an independent variably specifiable desired direction which are variably specifiable by the user via an input to the second screen of the input section, wherein the reference print position of the body text images includes a center position of the recording media, and the reference print position of the cover sheet image includes a center position of the cover sheet, and wherein the variably specifiable desired amount and the variably specifiable desired direction for shifting the print area of the body text image data can be variably specified by the user regardless of a sheet size of the recording media, and the independent variably specifiable desired amount and the independent variably specifiable desired direction for shifting the print area of the cover sheet image data can be variably specified by the user regardless of a sheet size of the cover sheet; and
  a control section to control the image forming section to form the body text images by shifting the print area of the body text images corresponding to the body text image data away from the reference print position of the body text images on the recording media based on the body text image shift instruction inputted from the input section, and to form the cover sheet image on the cover sheet by shifting the print area of the cover sheet image corresponding to the cover sheet image data away from the reference print position of the cover sheet image based on the cover sheet image shift instruction.

2. The image forming apparatus of claim 1, wherein the print area of the body text image data is set to be smaller than a size of the recording media.

3. The image forming apparatus of claim 1, wherein when executing proof printing, the controller controls the image forming section to create register marks for indicating cutting positions at four corners on each of the cover sheet image and the body text image.

4. The image forming apparatus of claim 1, wherein the body text image shift instruction is for shifting the print area of the body text image data in a width direction of the body text image, and the cover sheet image shift instruction is for shifting the print area of the cover sheet image data in a width direction of the cover sheet image.

5. An image forming system which forms body text images on a plurality of recording media based on body text image data, forms a cover sheet image on a U-shaped cover sheet based on cover sheet image data, and covers a bundle of recording media on which the body text images are formed, with the U-shaped cover sheet on which the cover sheet image is formed, to perform case binding for forming a book, the image forming system comprising an image forming apparatus and an image forming control apparatus,
  wherein the image forming control apparatus comprises:
    a data generation section to generate document image data including the cover sheet image data and the body text image data;
    an input section which is configured to display a first screen for inputting a body text image shift instruction for shifting a print area of the body text image data away from a reference print position of the body text images on the recording media by a variably specifiable desired amount and in a variably specifiable desired direction which are variably specifiable by a user via an input to the first screen of the input section, and which is configured to display a second screen for inputting a cover sheet image shift instruction, independently from the body text image shift instruction, for shifting a print area of the cover sheet image data away from a reference print position of the cover sheet image on the cover sheet by an independent variably specifiable desired amount and in an independent variably specifiable desired direction which are variably specifiable by the user via an input to the second screen of the input section, wherein the reference print position of the body text images includes a center position of the recording media, and the reference print position of the cover sheet image includes a center position of the cover sheet, and wherein the variably specifiable desired amount and the variably specifiable desired direction for shifting the print area of the body text image data can be variably specified by the user regardless of a sheet size of the recording media, and the independent variably specifiable desired amount and the independent variably specifiable desired direction for shifting the print area of the cover sheet image data can be variably specified by the user regardless of a sheet size of the cover sheet; and
    a transmission section to transmit the body text image shift instruction, the cover sheet image shift instruction, and the document image data including the cover sheet image data and the body text image data, to the image forming apparatus, wherein the image forming apparatus comprises:

an image forming section to form the body text images on the recording media and to form the cover sheet image on the cover sheet;

an input section to input the document image data and the shift instructions; and a control section to control the image forming section to form the body text images by shifting the print area of the body text images corresponding to the body text image data away from the reference print position of the body text images on the recording media based on the body text image shift instruction inputted from the input section, and to form the cover sheet image on the cover sheet by shifting the print area of the cover sheet image corresponding to the cover sheet image data away from the reference print position of the cover sheet image based on the cover sheet image shift instruction.

6. A non-transitory computer-readable storage medium having stored thereon a control program that is executable by an image forming apparatus, wherein the image forming apparatus forms body text images on a plurality of recording media based on body text image data, forms a cover sheet image on a U-shaped cover sheet based on cover sheet image data, and covers a bundle of recording media on which the body text images are formed with the U-shaped cover sheet on which the cover sheet image is formed, to perform case binding for forming a book, the control program being executable by the image forming apparatus to perform functions comprising:

displaying on an input section of the image forming apparatus a first screen for inputting a body text image shift instruction to shift a print area of the body text image data away from a reference print position of the body text images on the recording media by a variably specifiable desired amount and in a variably specifiable desired direction which are variably specifiable by a user via an input to the first screen of the input section, and displaying on the input section a second screen for inputting a cover sheet image shift instruction, independently from the body text image shift instruction, to shift a print area of the cover sheet image data away from a reference print position of the cover sheet image on the cover sheet by an independent variably specifiable desired amount and in an independent variable specifiable desired direction which are variably specifiable by the user via an input to the second screen of the input section, wherein the reference print position of the body text images includes a center position of the recording media, and the reference print position of the cover sheet image includes a center position of the cover sheet, and wherein the variably specifiable desired amount and the variably specifiable desired direction for shifting the print area of the body text image data can be variably specified by the user regardless of a sheet size of the recording media, and the independent variably specifiable desired amount and the independent variably specifiable desired direction for shifting the print area of the cover sheet image data can be variably specified by the user regardless of a sheet size of the cover sheet; and forming the body text images on the recording media by shifting the print area of the body text images corresponding to the body text image data away from the reference print position of the body text images based on the body text image shift instruction, and forming the cover sheet image on the cover sheet by shifting print area of the cover sheet image corresponding to the cover sheet image data away from the reference print position of the cover sheet image based on the cover sheet image shift instruction.

\* \* \* \* \*